US008978012B1

(12) United States Patent
Poole

(10) Patent No.: US 8,978,012 B1
(45) Date of Patent: Mar. 10, 2015

(54) METHOD AND SYSTEM FOR ERROR REPORTING AND CORRECTION IN TRANSACTION-BASED APPLICATIONS

(75) Inventor: James Cabell Poole, Oviedo, FL (US)

(73) Assignee: Symantec Operating Corporation, Mountain View, CA (US)

( * ) Notice: Subject to any disclaimer, the term of this patent is extended or adjusted under 35 U.S.C. 154(b) by 1126 days.

(21) Appl. No.: 12/057,809

(22) Filed: Mar. 28, 2008

(51) Int. Cl.
*G06F 11/07* (2006.01)
(52) U.S. Cl.
USPC ............... 717/124; 717/174; 717/127
(58) Field of Classification Search
USPC .......................................... 717/174
See application file for complete search history.

(56) References Cited

U.S. PATENT DOCUMENTS

| | | | | |
|---|---|---|---|---|
| 2002/0194319 | A1* | 12/2002 | Ritche | 709/223 |
| 2005/0188273 | A1* | 8/2005 | Angelo et al. | 714/39 |
| 2006/0010345 | A1* | 1/2006 | Schnoebelen et al. | 714/25 |
| 2007/0250615 | A1* | 10/2007 | Hillier | 709/223 |
| 2007/0266371 | A1* | 11/2007 | Ramakrishnan | 717/121 |
| 2008/0141221 | A1* | 6/2008 | Benesovska et al. | 717/124 |
| 2008/0141240 | A1* | 6/2008 | Uthe | 717/174 |

OTHER PUBLICATIONS

"How to: Configure Microsoft Error Reporting." How to: Configure Microsoft Error Reporting. Microsoft Corporation, Dec. 2006. Web. Sep. 25, 2014. <http://msdn.microsoft.com/en-us/library/bb219076%28v%3Doffice.12%29.aspx>.*
"Corporate Error Reporting Architecture—Microsoft." Corporate Error Reporting Architecture—Microsoft. Microsoft Corporation, 2003. Web. Sep. 25, 2014. <http://www.google.com/url?sa=t&rct=j&q=&esrc=s&frm=1&source=web&cd=4&ved=0CDUQFjAD&url=http%3A%2F%2Fdownload.microsoft.com%2Fdownload%2F5%2Fb%2F7%2F5b7b7e10-4f77-4341-96fd-6c7abb266b3c%2FCorp_>.*

* cited by examiner

*Primary Examiner* — Chameli Das
*Assistant Examiner* — Joanne Macasiano
(74) *Attorney, Agent, or Firm* — Campbell Stephenson LLP

(57) ABSTRACT

A system, apparatus and method for reporting a failure in execution of a software transaction (e.g., scripts and executables to install software on a computer) to a network resource that can then store the error-related information and automatically provide a previously determined solution to the error or links to resources to which the customer can refer for help in resolving the problem is provided. Automatically searching a database of reported errors and their solutions for a variety of products and providing a found solution to a customer experiencing an error (e.g., an installation error) is further provided. In the event that a solution to a customer-experienced error is not found by the network resource, alternate sites for information such as a customer support website can also be provided.

20 Claims, 6 Drawing Sheets

METHOD AND SYSTEM FOR ERROR REPORTING AND CORRECTION IN TRANSACTION-BASED APPLICATIONS

FIELD OF THE INVENTION

The present invention relates to the field of computer software error reporting and correction, and particularly to a system and method for reporting errors occurring in a transaction based application, such as in software installation, and receiving fixes for the errors or aids in locating fixes for the errors automatically.

BACKGROUND OF THE INVENTION

Computers, both those used in the home and those used by businesses, find much of their utility based in the software that is executed upon those computers. In many cases, the first experience that a computer user or system administrator has with software is during the process of installing the software on a computer. It is often said that the first impression is the most important and this holds true as much in a software context as in any other.

Since installation is often the first encounter a customer has with a product, any negative experience can be detrimental to the quality associated with that product by the customer. For example, if a customer is evaluating software and cannot get the product installed, it is likely that the customer will not purchase the software later. Such installation problems may often go undetected by those responsible for creating installation methods for software (e.g., software engineers) because there has been no reliable method for providing information as to such failures. In the past, often sales or technical support has had to relay customer experiential information rather than hard data related to an installation failure.

Another issue presented to customers experiencing software installation failure has been an inability for the customer to automatically receive help, either in the form of a fix for the problem or links to advice for solving the problem. It is therefore desirable to have a mechanism by which data related to a software installation failure is provided to members of the entity distributing the software, as well as a mechanism for automatically providing a solution or at least information related to the problem automatically to the customer.

Similarly, if a customer experiences errors in other transaction based applications, such as with backup jobs or programs having submitted requests that are then processed, if a failure occurs during processing often the problem goes unresolved or inadequately resolved and the reputation of the software suffers. It is therefore desirable to have a mechanism by which errors in transaction-based processes are reported to members of the entity distributing the software, as well as a mechanism for automatically providing a solution or information related to the problem to the customer.

SUMMARY OF THE INVENTION

A system, apparatus and method for reporting a failure in execution of a software transaction (e.g., scripts and executables to install software on a computer) to a network resource that can then store the error-related information and automatically provide a previously determined solution to the error or links to resources to which the customer can refer for help in resolving the problem is provided. Automatically searching a database of reported errors and their solutions for a variety of products and providing a found solution to a customer experiencing an error (e.g., an installation error) is further provided. In the event that a solution to a customer-experienced error is not found by the network resource, alternate sites for information such as a customer support website can also be provided.

Embodiments of the present invention provide a mechanism for detecting an execution-related failure associated with execution of a software item, then acquiring a specified set of data associated with the execution-related failure. The specified set of data is then submitted for analysis to determine whether a solution to the execution related failure is available, and if so, then the solution is executed. One aspect of the present invention also provides identifying information to a source of support for the software item, if a solution to the execution-related failure is not available. Another aspect of the present invention provides for specifying the specified set of data using a template file that includes identification of each specified data item, which are associated with execution of the software item.

A further embodiment of the present invention provides for an error handling server to which the specified data is sent. Aspects of this embodiment provide for the error handling server to be configured to search through a set of solutions associated with execution-related failures for the software item for a match to the specified data, provide a solution associated with the match, if found, and provide identifying information to a source of support, if a match is not found.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Embodiments of the present invention provide a system and method for reporting a failure in execution of a software transaction (e.g., scripts and executables to install software on a computer) to a network resource that can then store the error-related information and automatically provide a previously determined solution to the error or links to resources to which the customer can refer for help in resolving the problem. Embodiments of the present invention provide for automatically searching a database of reported errors and their solutions for a variety of products and providing a found solution to a customer experiencing an error (e.g., an installation error). In the event that a solution to a customer-experienced error is not found by the network resource, embodiments of the present invention can refer a customer to alternate sites for information such as a customer support website.

Embodiments of the present invention can be used to aid in analysis and correction of a variety of software errors, and specifically errors involving transaction-based applications. Transaction-based applications include, for example, applications that permit a request to be submitted to a program, either real-time or a scheduled trigger, and the program subsequently processes the request. Transaction-based application can include use of software installation scripts, batch processing, and backup processing jobs. In the description of the present invention provided below, examples are drawn from software installation scripts, but it should be understood that the concepts of the present invention are not limited to software installation.

Figure 1:
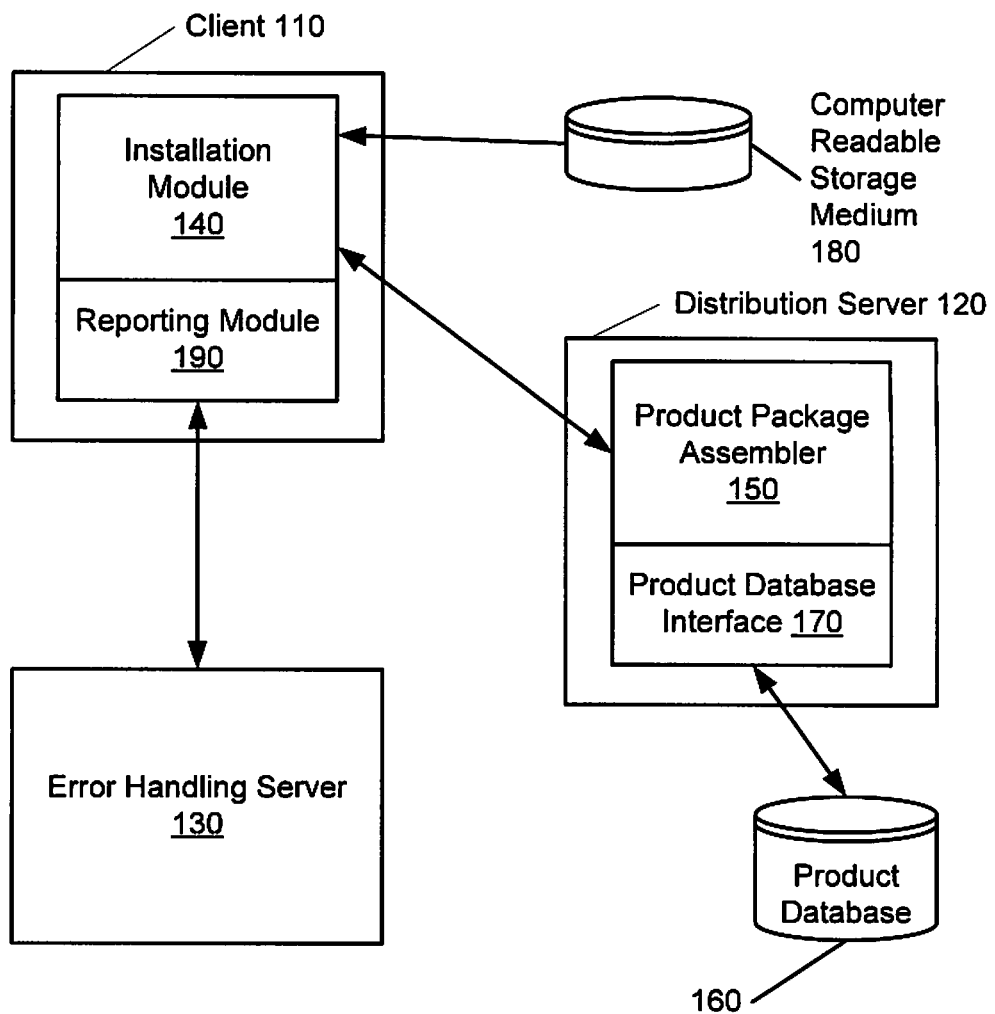
FIG. 1 is a simplified block diagram illustrating network-coupled nodes that are configured to implement embodiments of the present invention.

FIG. 1 is a simplified block diagram illustrating network-connected nodes that are configured to implement embodiments of the present invention. Client 110 is a customer computer system coupled to a network (e.g., the Internet) through which client 110 can communicate with, for example, a distribution server 120 and an error handling server 130. During a software installation process, client 110 can execute an installation module 140. Installation module 140 can include, for example, scripts and executables necessary to the process of installing one or more software products. Installation module 140 can be configured or provided by distribution server 120. Distribution server 120 can provide installation modules through the use of a product package assembler 150 that accesses various scripts and executables necessary to install products from a product database 160 via a product database interface 170. Alternatively, installation module 140 can be configured or supplied by a computer readable storage medium 180 coupled to client 110. A computer-readable storage medium can include devices configured to store computer data and instructions such as, for example, hard drives, removable disk media, optical media, solid state media, and the like.

Client 110 installs the software products associated with installation module 140 by executing the scripts and executables associated with the installation module. In the event of an error in installing a product associated with installation module 140, client 110 can execute a reporting module 190. Reporting module 190 can be specifically associated with installation module 140 and the products therein. Reporting module 190 can collect information related to the failure in the software installation and provide that information to error handling server 130. Error handling server 130 can then provide responsive information to the error reported back to reporting module 190. Details related to reporting module 190 and error handling 130 are discussed below. Reporting module 190 is configured to provide the information received from error handling server 130 to the customer associated with client 110 for further action.

Figure 2:
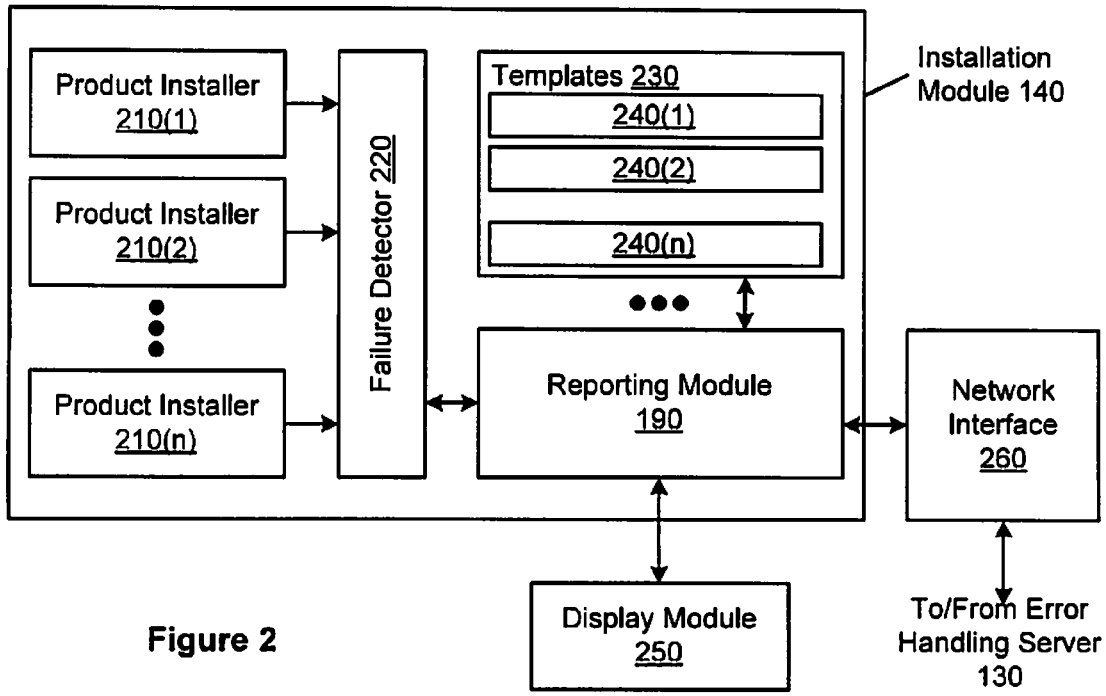
FIG. 2 is a simplified block diagram illustrating an installation module, in accord with embodiments of the present invention.

FIG. 2 is a simplified block diagram illustrating an installation module 140, in accord with embodiments of the present invention. As stated above, installation module 140 can be configured to install one or more products. For each product, installation module 140 includes product installers 210(1)-(*n*), each of which include scripts and executables configured to install an associated product or part of a product. In the event of a failure during the execution of one or more of product installers 210(1)-(*n*), an error code describing the error can be generated and included in an installation log. Failure detector 220 can detect the presence of an error code or other indicia of a failure during an installation process and notify reporting module 190 of such a failure. The failure detector can detect the error code by, for example, scanning an installation log for error codes or can be directly provided the error code by a product installer.

Failure detector 220 can provide reporting module 190 with information such as the error code as well as an identification of the product associated with the failed installation. Reporting module 190 can then access a template file from template storage 230. Each template file 240(1)-(*n*) is associated with a specific product. Each template file can include, for example, the associated product name, the version of the product, and a set of identifiers for data that should be reported to the error handling server. The template file can be a file of any standardized form, for example, an XML data file. Reporting module 190 can then gather the specified information identified by the template file in preparation for reporting it to error handling server 130. This information can take the form of either raw data (e.g., memory dumps) or can be references to log files associated with the failed product installer.

Once the failure-related information identified by the associated template file 240 has been gathered, reporting module 190 can then provide a listing of the gathered data to a user of client computer 110 via display module 250. The user can then be given an opportunity to open, or otherwise inspect, the gathered data items in order to determine whether to send each item to the error handling server (e.g., the user can read through the install log or any other log file). The user can then be given an opportunity to permit or deny transmission of each data item to the error handling server. Thus, a user can protect potentially sensitive information that may appear in one or more of the log files gathered by reporting module 190. Once the user permits the sending of data, reporting module 190 can then transmit the selected failure-related data to error handling server 130 via a network interface 260.

Similarly, errors occurring during execution of other transaction-based software can also be gathered, inspected and transmitted to an error handling server. For example, if an error occurred during performance of a data backup, the system could gather information related to that backup job (e.g., backup logs), provide the gathered information to the submitter of the backup job (e.g., a system administrator), allow the submitter to determine whether to send the gathered information to the error handling server, and then transmit selected information to the error handling server.

Figure 3:
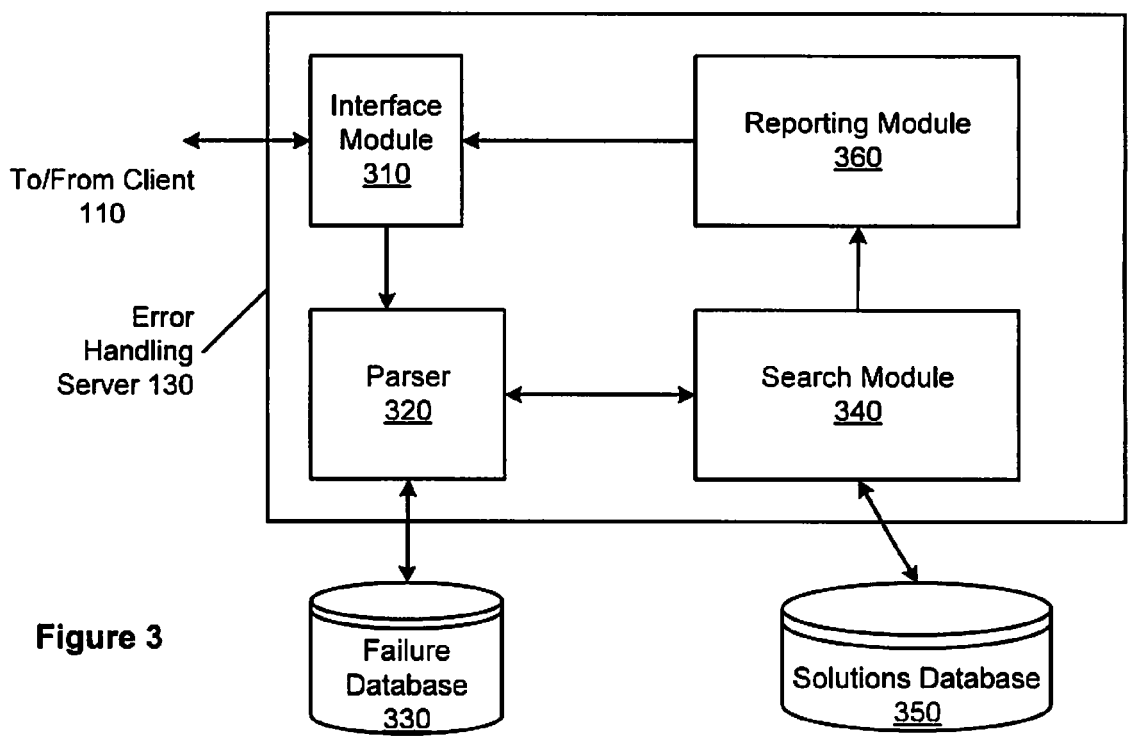
FIG. 3 is a simplified block diagram of an error handling server configured in accord with embodiments of the present invention.

FIG. 3 is a simplified block diagram of an error handling server configured in accord with embodiments of the present invention. Error handling server 130 is configured to receive the failure-related information from client computer 110 and provide a solution to the failure, if any is available, back to client computer 110. Error handling server 130 receives the failure-related information from client 110 via an interface module 310. Interface module 310 provides the error information to a parser 320. Parser 320 can scan the failure-related information and store the failure-related information in accord with the results of the scanning. For example, parser 320 can determine the product name and version of the associated product and provide the failure-related information to a failure database 330 to be stored as a table entry associated with the product name and version. Parser 320 can further scan the failure-related information for error-specific data such as an error code and associate the stored table entry in failure database 330 with the error specific data, as well.

Search module 340, as will be discussed in greater detail below, is configured to search a solutions database table 350 for any solutions related to the reported failure-related information. Parser 320 can provide search module 340 with information from the failure-related data necessary to enable an efficient search of solutions database 350. Such information can include, for example, product name, product version, error code, and information from log files relevant to the reported error code.

While FIG. 3 illustrates two separate databases for the failure database and the solutions database, it should be realized that the failure-related information and the solutions information can be stored in the same or separate databases. For example, a single database can have a table configured to store failure-related data and a second table configured to store reporting node information. In addition, that database can include one or more tables configured to store solution related information (e.g., a table associated with each product having a reported solution with entries in each of those tables corresponding to each available solution). Alternatively, multiple databases can be used to store the tables. For example, security concerns may suggest having a separate database for the reported failure-related information, since that database and any associated storage will be storing information from untrusted sources (e.g., customer computers).

Upon completion of the search, search module 340 provides the results of the search to reporting module 360. If a positive search result is obtained, the results can include, for example, an executable or an updated product installer configured to resolve the experienced failure in the installation. If the search results are negative, reporting module 360 can use information related to the software associated with the failed installation to identify a support site that a user of the client computer can access for further help. Reporting module 360 can then configure the information received as a result of the search or the location of support site in a form usable by client computer 110 and provide that information to interface module 310 for transmission to client 110.

Upon receiving the information from error handling server 130, reporting module 190 can display that information to the user of client computer 110 on display module 250. The user can then decide whether to execute the solution, if provided, or to visit the suggested site.

Figure 4:
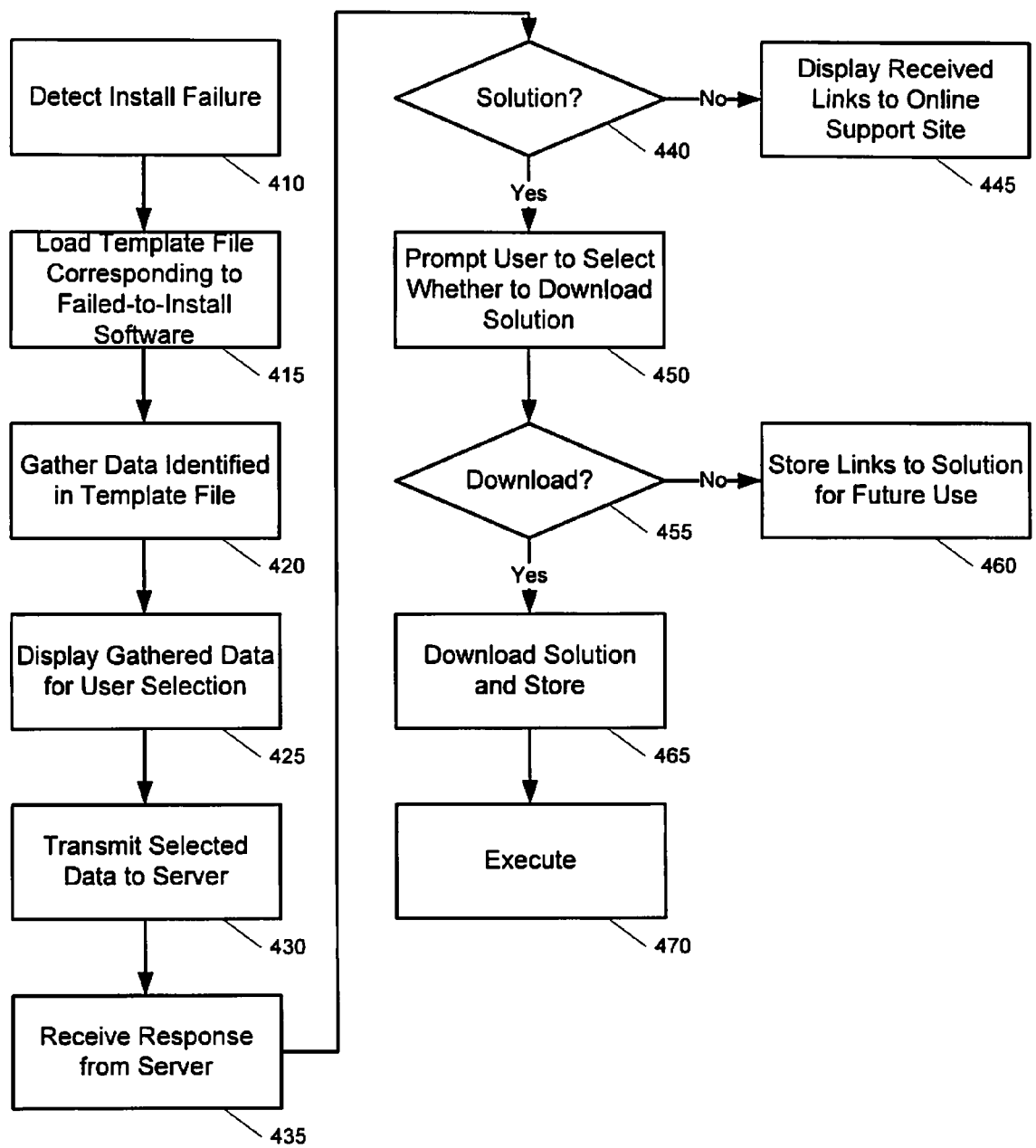
FIG. 4 is a simplified flow diagram illustrating steps carried out by a client computer, in accord with embodiments of the present invention.

FIG. 4 is a simplified flow diagram illustrating steps carried out by a client computer 110, in accord with embodiments of the present invention. The client computer can detect an installation failure (410) which can include, for example, receiving an error code associated with installation of a product. Detection of an installation failure triggers execution of a reporting module. The reporting module loads a template file associated with the software that failed to install (415). As stated above, the template file can include identifiers of data associated with installation of the software that is desirable to be reported to an error handling service for analysis. That identified data is then gathered (420) and can then be displayed to a user of the client computer to allow a user to select data to send or not to send (425). Upon selection of data to send, the selected data is transmitted to an error handling server (430).

After the error handling server has analyzed the failure-related information, the client computer receives a response from the error handling server (435). A determination is then made as to whether a solution is provided by the error handling server (440), and if so, a user of the client computer is prompted to see if the user desires to download the solution and execute that solution (450). If the user decides to download the solution (455), then the solution is downloaded and stored on the client computer (465) and then executed (470). If the user opts not to download the solution at this time (455), then links to the solution can be stored for future use (460). If the error handling server does not provide a solution to the failure (440), then the client computer can display to the user any links received to an online support site (445).

Figure 5:
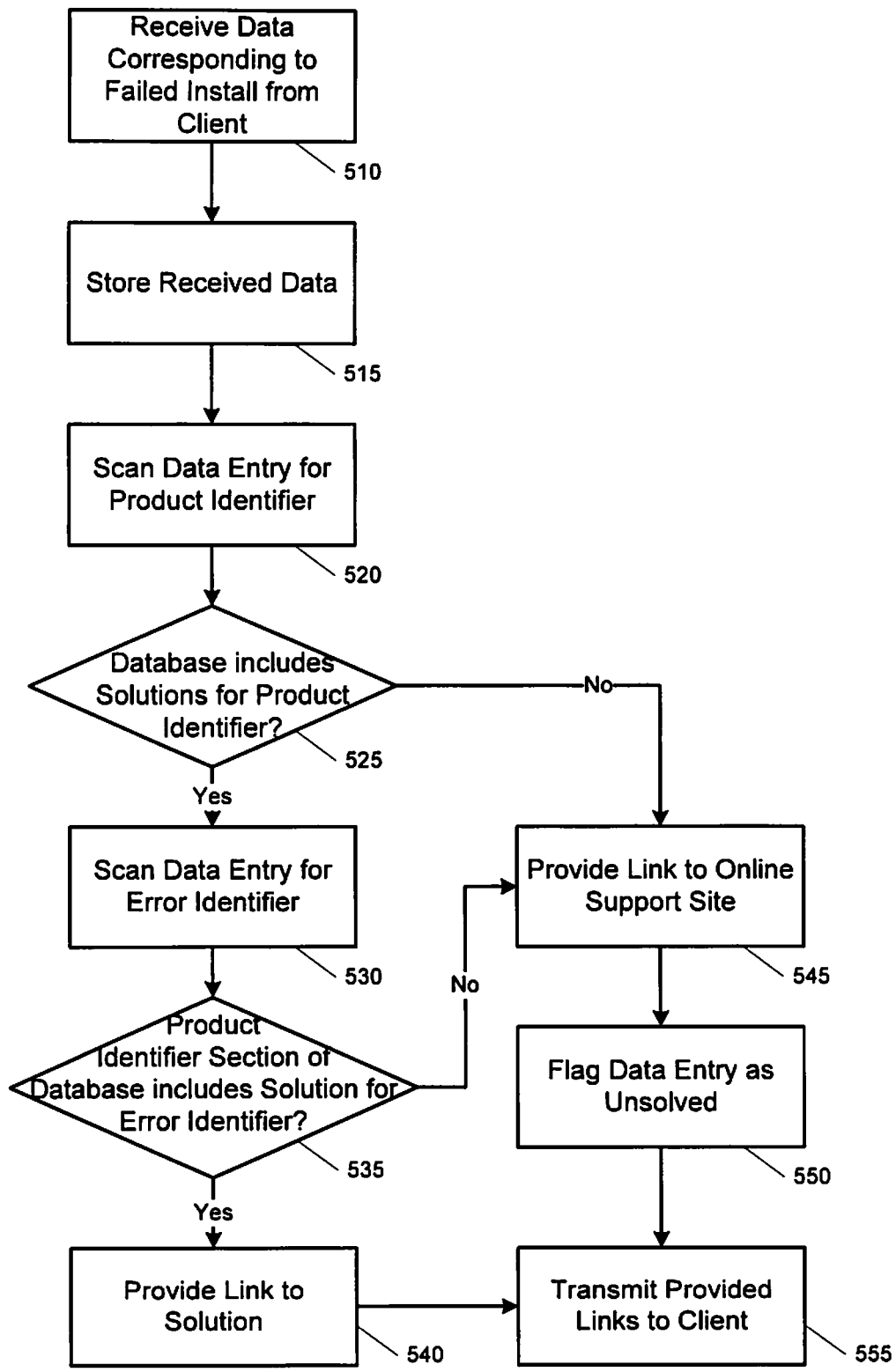
FIG. 5 is a simplified flow diagram illustrating steps carried out by an error handling server in response to receiving failure-related information, in accord with embodiments of the present invention.

FIG. 5 is a simplified flow diagram illustrating steps carried out by an error handling server in response to receiving failure-related information, in accord with embodiments of the present invention. The error handling server receives failure-related data from the client computer (510) and can then store that failure-related data (515). As stated above, the failure-related data can be stored in a database in entries associated with, for example, the product name, the version of the product, an associated error code, and the like.

The error handling server can then scan the failure-related information for a product identifier (520) and scan a solutions database for entries associated with that product identifier. If the database includes solutions for the product identifier (525), the failure-related data can be scanned for indicia of the error that occurred (530). Error indicia can include, for example, an error code or specific information within one or more error logs. The solutions database can then be scanned for entries corresponding to the error indicia within the section of the database related to the product identifier (535), and if a matching entry is found, a link to the solution to the failure can be provided (540). Again, such a solution can include, for example, an executable, a script, or specific instructions to fixing the failure.

Embodiments of the present invention can also provide different data-handling techniques for different products associated with the failure-related data. For example, a specific product assembly associated with a product can provide locations within various provided data sources in the failure-related instruction from which to collect identifying information related to the error. For example, specific error information may be found within certain log files or in one or more memory locations. The product specific assembly can be configured to provide this information, or a manipulated form of that information (e.g. subjecting this information to a hash function), for the solutions database search.

If the database does not provide any solutions to the failures related to the product identifier (525) or there are no solutions for the identified error (535), then a link can be provided to an online support site (545). In addition, the entry associated with the failure-related data can be flagged as unsolved (550). Links generated by the search are then transmitted back to the client computer (555).

In the event that no solutions for a failure-related entry are found in the solutions database, the entry is flagged for further investigation by engineering personnel. In this manner, engineering personnel can receive detailed information as to the nature of an installation failure and determine if the issue is significant enough to warrant generation of a specific solution to the reported problem. If so, engineering staff can generate the specific solution and store references to that solutions within the solutions database. In addition, engineering staff can use the reported failure-related information to contact the reporting client when a solution to the failure has been generated.

One example of a solution provided by embodiments of the present invention is as follows. A software may be released with a bug in the installation scripts that causes the install to fail if a "remote registry" system service is stopped. An error code is generated in the install log when this occurs. Logs related to this failure are reported to the error handling server. After 10 to 20 customers send their install logs containing this error to the error handling server, engineering is asked to create an executable that will turn on the "remote registry" service. This executable is uploaded to the error handling server and the solutions database is provided with an entry to reference this executable as a solution any time an install log is submitted that contains the related error code. From this point on, if a customer experiences the error, they will be given an opportunity to automatically download the executable that will fix their system and allow the installation to complete successfully.

Through the use of the error handling server, embodiments of the present invention go beyond merely reporting an installation issue, but also take proactive steps to fix an installation-related issue. Further, the range of available fixes to installation-related issues are broadened through the use of the reporting feature and the solutions database. Thus, solutions are not limited to those built into a reporting client. Also, the nature of data sent to the error handling server by a reporting client is dynamic because the template files are associated with each separate product being installed. Thus, those template files are as modifiable as any individual installation over time. Finally, embodiments of the present invention can provide installation-related failure fixes at the time of the installation automatically, thereby improving a customer user's initial experience with the software.

An Example Computing and Network Environment

As shown above, the present invention can be implemented using a variety of computer systems and networks. An example of one such computing and network environment is described below with reference to FIGS. 6 and 7.

Figure 6:
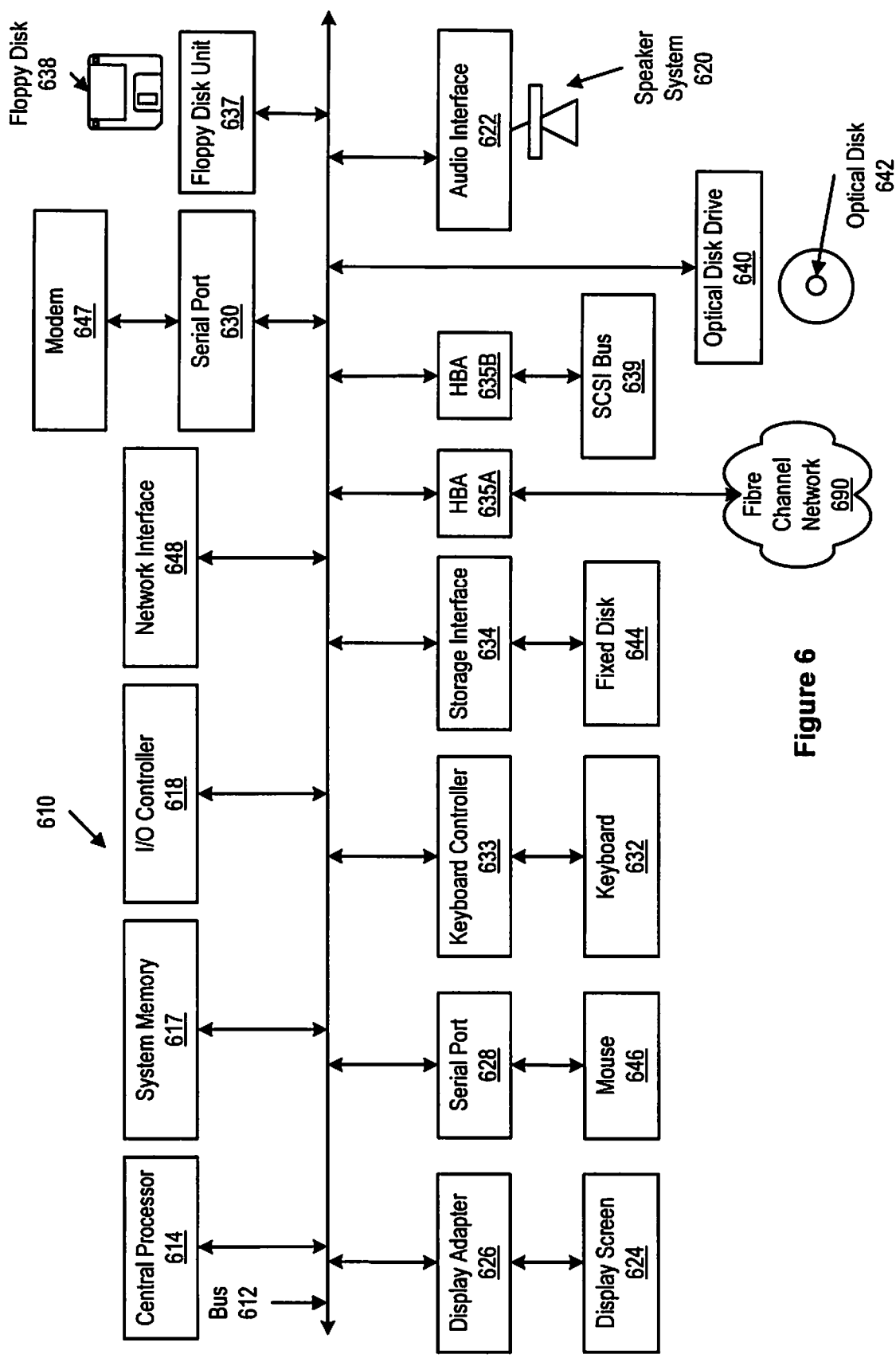
FIG. 6 depicts a block diagram of a computer system suitable for implementing the present invention.

FIG. 6 depicts a block diagram of a computer system 610 suitable for implementing the present invention. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer readable medium, such as a hard disk drive (e.g. fixed disk 644), an optical drive (e.g. optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an Internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present invention. The devices and subsystems can be interconnected in different ways from that shown in FIG. 4. The operation of a computer system such as that shown in FIG. 6 is readily known in the art and is not discussed in detail in this application. Code to implement the present invention can be stored in computer-readable storage media such as one or more of system memory 617, fixed disk 644, optical disk 642, or floppy disk 638. The operating system provided on computer system 610 may be MS-DOS®. MS-WINDOWS®. OS/2®. UNIX®, Linux®, or another known operating system.

Moreover, regarding the signals described herein, those skilled in the art will recognize that a signal can be directly transmitted from a first block to a second block, or a signal can be modified (e.g. amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g. there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
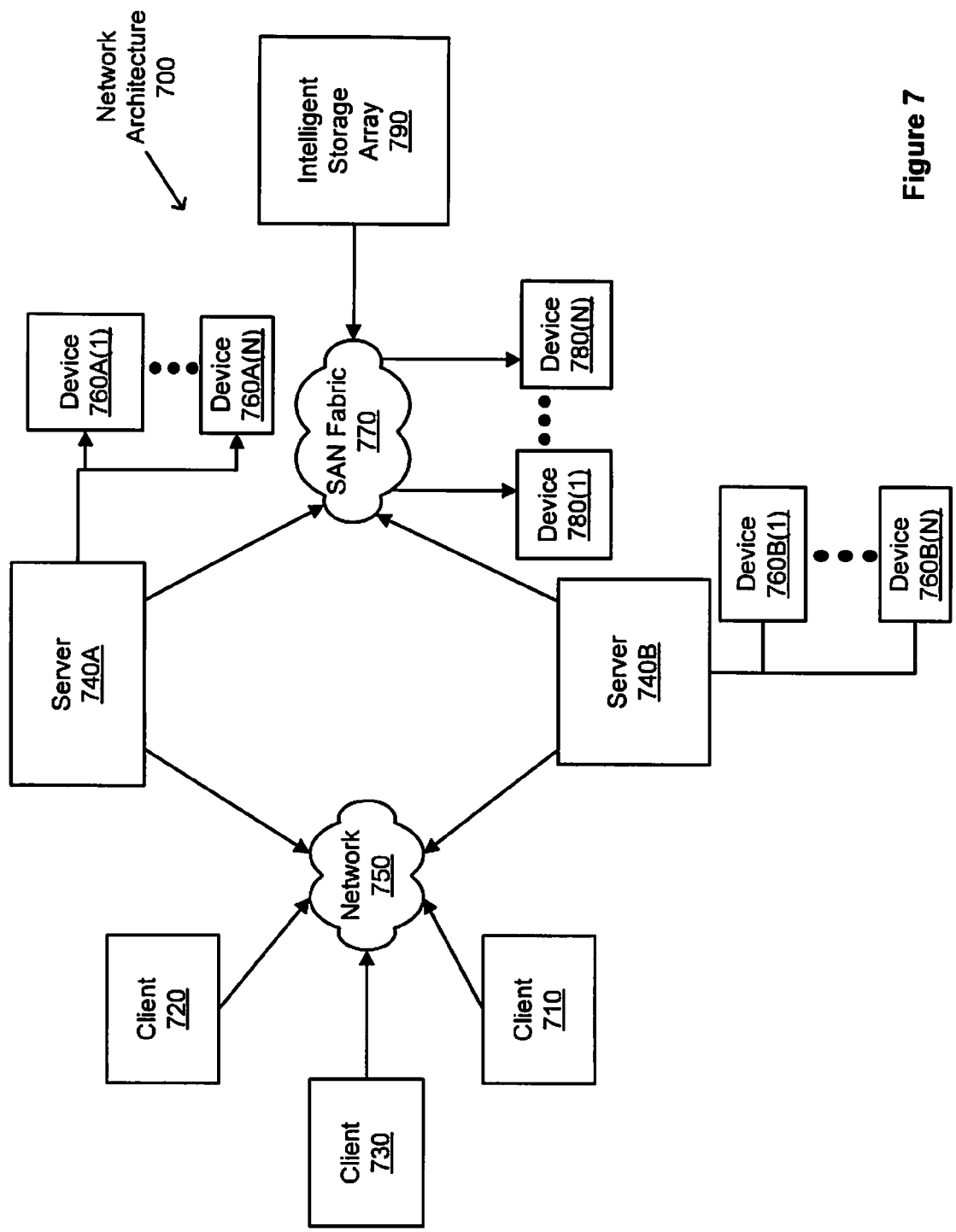
FIG. 7 is a block diagram depicting a network architecture suitable for implementing the present invention.

FIG. 7 is a block diagram depicting a network architecture 700 in which client systems 710, 720 and 730, as well as storage servers 740A and 740B (any of which can be implemented using computer system 610), are coupled to a network 750. Storage server 740A is further depicted as having storage devices 760A(1)-(N) directly attached, and storage server 74013 is depicted with storage devices 760B(1)-(N) directly attached. Storage servers 740A and 740B are also connected to a SAN fabric 770, although connection to a storage area network is not required for operation of the invention. SAN fabric 770 supports access to storage devices 780(1)-(N) by storage servers 740A and 740B, and so by client systems 710,

720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720 and 730 to network 750. Client systems 710, 720 and 730 are able to access information on storage server 740A or 740B using, for example, a web browser or other client software (not shown). Such a client allows client systems 710, 720 and 730 to access data hosted by storage server 740A or 740B or one of storage devices 760A(1)-(N). 760B(1)-(N). 780(1)-(N) or intelligent storage array 790. FIG. 7 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 610). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include computer-readable storage media, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    detecting, at a computer system, an execution-related failure associated with an execution of a first software item of a plurality of software items, wherein
        the plurality of software items comprises the first software item;
    automatically identifying a first template file from a plurality of template files, wherein
        each software item of the plurality of software items is associated with a template file of the plurality of template files,
        the first template file is automatically identified based on the first software item, and
        the first template file specifies a set of data associated with the execution-related failure;
    acquiring the set of data, wherein
        the acquiring the set of data is based on the first template file, and
        at least a portion of the set of data is acquired after the first template file is automatically identified;
    submitting the set of data for analysis to determine whether a solution to the execution-related failure is available, wherein
        the submitting the set of data for analysis comprises transmitting the set of data to an error handling server, and
        the error handling server is configured to
            automatically search a set of solutions for the solution to the execution-related failure;
    receiving, at the computer system, the solution from the error handling server; and in response to the receiving the solution from the error handling server, executing, using a processor of the computer system, the solution to the execution-related failure.

2. The method of claim 1 further comprising:
providing identifying information to a source of support for the first software item, if the solution to the execution-related failure is not available.

3. The method of claim 1 wherein
the first template file identifies each data item in the set of data, and
each data item in the set of data is associated with the execution of the first software item.

4. The method of claim 1 further comprising:
installing the plurality of software items, wherein
the execution-related failure is an installation-related failure, and
the installation-related failure is related to a failure of an installation of the plurality of software items.

5. The method of claim 1 wherein said detecting the execution-related failure comprises detecting an error code generated by an installation of the first software item.

6. The method of claim 1 wherein
the error handling server is further configured to
search the set of solutions associated with corresponding criteria associated with execution-related failures associated with the first software item for a match to the set of data associated with the execution-related failure,
provide a solution associated with the match, if the match is found, and
provide identifying information to a source of support for the first software item, if the match is not found.

7. The method of claim 6 wherein the error handling server is further configured to:
store the set of data, and
flag the set of data for further analysis, if the match is not found.

8. The method of claim 1 further comprising:
displaying identifying data related to the set of data to a user; and
limiting a set of data subjected to said submitting for analysis to a selected subset of the set of data, wherein the selected subset is selected by the user upon review of the identifying data.

9. The method of claim 1, wherein
the solution comprises a revised first software item, and
the revised first software item is configured to be executed instead of the first software item.

10. The method of claim 1, wherein
the executing is performed in response to a determination to execute the solution,
wherein
the solution is displayed to a user;
the user is provided with
an option to perform the solution, and
an option to not perform the solution; and
the determination to execute the solution comprises the user selecting the option to perform the solution.

11. The method of claim 10, wherein
the executing further comprises
downloading the solution to the computer system, wherein
the executing is performed in response to the downloading.

12. An apparatus comprising:
a processor; and
a first memory, coupled to the processor, and storing instructions executable by the processor, the instructions configured to
detect an execution-related failure associated with an execution of a first software item of a plurality of software items, wherein
the plurality of software items comprises the first software item,
automatically identify a first template file from a plurality of template files,
wherein
each software item of the plurality of software items is associated with a template file of the plurality of template files,
the first template file is automatically identified based on the first software item, and
the first template file specifies a set of data associated with the execution-related failure;
acquire the set of data, wherein
the set of data is acquired based on the first template file, and
at least a portion of the set of data is acquired after the first template file is automatically identified;
submit the set of data for analysis to determine whether a solution to the execution-related failure is available, wherein
the submitting the set of data for analysis comprises transmitting the set of data to an error handling server, and
the error handling server is configured to
automatically search a set of solutions for the solution to the execution-related failure,
receive, at the computer system, the solution from the error handling server, and
in response to receipt of the solution from the error handling server, execute the solution to the execution-related failure.

13. The apparatus of claim 12 wherein the execution-related failure is an installation-related failure and further comprising:
a second memory storing the first template file, wherein
each data item in the set of data is associated with an installation of the first software item.

14. The apparatus of claim 13 further comprising:
the first memory further storing instructions configured to install the plurality of software items; and
the second memory further stores an associated template file for each software item of the plurality of software items.

15. The apparatus of claim 13 wherein said detecting the execution-related failure comprises detecting an error code generated by the installation of the first software item.

16. The apparatus of claim 12 further comprising:
a network interface, coupled to the processor, and configured to perform the transmitting of the set of data to the error handling server, wherein
the error handling server is further configured to
search a set of solutions associated with corresponding criteria associated with execution-related failures associated with the first software item for a match to the set of data associated with the execution-related failure,
provide a solution associated with the match, if the match is found, and provide identifying information to a source of support for the first software item, if the match is not found.

17. The apparatus of claim 12 further comprising:
a display, coupled to the processor, and configured to display identifying data related to the set of data to a user; and
the first memory further storing instructions configured to limit a set of data subjected to said submitting for analysis to a selected subset of the set of data, wherein the selected subset is selected by the user upon review of the identifying data.

18. A system comprising:
a processor;
an installation module, executable by the processor, configured to
  perform steps related to an installation of a first software item of a plurality of software items, wherein
    the plurality of software items comprises the first software item, and
  detect an installation-related failure associated with the installation of the first software item; and
a reporting module configured to
  automatically identify a first template file from a plurality of template files,
    wherein
      each software item of the plurality of software items is associated with a template file of the plurality of template files,
      the first template file is automatically identified based on the first software item, and
      the first template file specifies a set of data associated with the installation-related failure;
  acquire the set of data, wherein
    the set of data is acquired based on first template file, and
    at least a portion of the set of data is acquired after the first template file is automatically identified,
  submit the set of data for analysis to determine whether a solution to the installation-related failure is available, wherein
    the reporting module is configured to perform the submitting the set of data for analysis by
      transmitting the set of data to an error handling server, and
      the error handling server is configured to
        automatically search a set of solutions for the solution to the installation-related failure,
  receive the solution from the error handling server, and
  execute the solution to the installation-related failure.

19. The system of claim 18, wherein the error handling server is further configured to
receive the set of data from the reporting module,
search the set of solutions associated with corresponding criteria associated with installation-related failures associated with the first software item for a match to the set of data associated with the installation-related failure,
provide a solution associated with the match to the reporting module, if the match is found, and
provide identifying information to a source of support for the first software item to the reporting module, if the match is not found.

20. A computer program product comprising:
a plurality of instructions, comprising:
  a first set of instructions, executable by a processor, configured to detect an execution-related failure associated with an execution of a first software item of a plurality of software items, wherein
    the plurality of software items comprises the first software item,
  a second set of instructions, executable by the processor, configured to automatically identify a first template file from a plurality of template files, wherein
    each software item of the plurality of software items is associated with a template file of the plurality of template files,
    the first template file is automatically identified based on the first software item, and
    the first template file specifies a set of data associated with the execution-related failure;
  a third set of instructions, executable by the processor, configured to acquire the set of data, wherein
    the set of data is acquired based on the first template file, and
    at least a portion of the set of data is acquired after the first template file is automatically identified,
  a fourth set of instructions, executable by the processor, configured to submit the set of data for analysis to determine whether a solution to the execution-related failure is available, wherein
    the submitting the set of data for analysis comprises transmitting the set of data to an error handling server, and
    the error handling server is configured to
      automatically search a set of solutions for the solution to the execution-related failure,
  a fifth set of instructions, executable by the processor, configured to receive, at the computer system, the solution from the error handling server, and
  a sixth set of instructions, executable by the processor, configured to, in response to receipt of the solution from the error handling server, execute the solution to the execution-related failure, and
a non-transitory computer-readable storage medium, wherein the plurality of instructions are encoded in the non-transitory computer-readable storage medium.

* * * * *

UNITED STATES PATENT AND TRADEMARK OFFICE
CERTIFICATE OF CORRECTION

| | | |
|---|---|---|
| PATENT NO. | : 8,978,012 B1 | Page 1 of 1 |
| APPLICATION NO. | : 12/057809 | |
| DATED | : March 10, 2015 | |
| INVENTOR(S) | : James Cabell Poole | |

It is certified that error appears in the above-identified patent and that said Letters Patent is hereby corrected as shown below:

In the Claims:

Column 12
Line 6, in Claim 12, replace: "detect an" by -- detect, at a computer system, an --

Column 13
Line 34, in Claim 18, replace: "based on first" by -- based on the first --

Column 14
Line 12, in Claim 20, replace: "detect an" by -- detect, at a computer system, an --

Signed and Sealed this
Twenty-fourth Day of May, 2016

Michelle K. Lee
*Director of the United States Patent and Trademark Office*